United States Patent [19]

Essig et al.

[11] Patent Number: 4,488,006

[45] Date of Patent: Dec. 11, 1984

[54] APPARATUS FOR CONTROLLING THE APPLICATION OF TELEPHONE LINE POWER IN A TELEPHONE SET

[75] Inventors: Terrence L. Essig; Donald D. Huizinga; Donald R. Means, all of Indianapolis, Ind.

[73] Assignee: AT&T Bell Laboratories, Murray Hill, N.J.

[21] Appl. No.: 394,112

[22] Filed: Jul. 1, 1982

[51] Int. Cl.$^3$ ............................................. H04M 1/00
[52] U.S. Cl. ............................. 179/81 R; 179/100 L
[58] Field of Search ............. 179/70, 77, 81 R, 100 L, 179/2 BC, 2 DP; 307/130, 358; 364/707; 365/226, 227, 228

[56] References Cited

U.S. PATENT DOCUMENTS

| | | | |
|---|---|---|---|
| 3,027,428 | 3/1962 | Eklöv | 179/81 |
| 3,908,094 | 9/1975 | Deluegue | 179/81 B |
| 3,968,333 | 7/1976 | Simokat et al. | 179/2 BC X |
| 4,025,729 | 5/1977 | Stone | 179/2 BC X |
| 4,104,734 | 8/1978 | Herndon | 365/228 |
| 4,279,020 | 7/1981 | Christian et al. | 364/900 |
| 4,305,065 | 12/1981 | Mogi | 364/707 X |
| 4,315,162 | 2/1982 | Ferguson | 307/66 |
| 4,399,524 | 8/1983 | Muguruma et al. | 365/228 X |

FOREIGN PATENT DOCUMENTS

7916969  1/1981  France .
2078466  1/1982  United Kingdom .

Primary Examiner—Gene Z. Rubinson
Assistant Examiner—James L. Dwyer
Attorney, Agent, or Firm—H. L. Newman

[57] ABSTRACT

The present apparatus for controlling the application of telephone line power in a telephone set has obviated the requirement for a local source of power at the premises of a telephone customer. A data processor-based telephone set incorporating the present invention comprises a power supply having first and second voltage storage devices (C401, C402) which accumulate charge from the telephone line. First and second regulator circuits (410, 420) regulate the charging of the voltage storage devices and the power distribution to power-consumptive components of the telephone set during on-hook and off-hook switchhook conditions. A voltage threshold detector (301) actuates a power-down of power consumptive components including the data processor (210) when the power supply voltage falls below a particular threshold value. In the meantime, power is continuously provided to certain essential components such as the volatile memory (220) of the data processor. A telephone impedance switch (202) under data processor control intentionally increases the resistance of the telephone set so that the telephone line voltage delivered to the telephone set is increased, the increased voltage powering certain components of the telephone which require the higher voltage level for proper operation.

7 Claims, 7 Drawing Figures

APPARATUS FOR CONTROLLING THE APPLICATION OF TELEPHONE LINE POWER IN A TELEPHONE SET

TECHNICAL FIELD

This invention relates generally to telephone station apparatus and, more particularly, to apparatus for controlling the application of telephone line power in a telephone set.

BACKGROUND OF THE INVENTION

A problem exists as residential telephone station equipment has become more complex. Telephone line DC power has proven insufficient to power the features available in the latest commercial offerings of residential feature telephone station sets. A feature telephone station set is a telephone set having a data processor and providing a host of features. These features may include among others, repertory dialing, alpha-numeric display, user programming and hands-free loudspeaker operation. Frequently, transformers and rectifiers operating off alternating current power or batteries are provided with such telephone sets at a residence to alleviate the power problem.

Powering the telephone station sets with rectified alternating current power can cause undesirable noise which can be induced into the telephone communications path. Using batteries, on the other hand, has brought about a different problem, namely, that of monitoring closing the loss of battery power and having to periodically replace the batteries.

One solution to the power consumption problem has been to carefully apply the power resources available. For example, R. W. Christian and W. G. Kutzavitch, in U.S. Pat. No. 4,279,020, teach that a microprocessor of a telephone set may be powered up and powered down responsive to an input received from a data input device such as a keyboard. In a data processor-based feature telephone set, it is the data processor which consumes most of the battery power. Thus, Christian and Kutzavitch teach that the data processor can be powered up only when it is needed. For power-down, the data processor actuates a power-down subcircuit which removes power from the data processor. Meanwhile, battery power is continuously provided to the volatile random access memory of the data processor.

Ferguson, U.S. Pat. No. 4,315,162, discloses a reserve power supply for data processing systems which comprises first and second sources of direct current power. Under processor control, the sources may be connected in parallel or in series in order to increase their voltage output. Furthermore, Ferguson discloses a circuit for converting the DC voltage from one supply into a plurality of voltage levels.

Both solutions fail to eliminate a requirement for locally provided battery or rectified alternating current in data processor-based feature telephone station apparatus. There remains a requirement for improved line power control means, the objective being a wholly line-powered feature telephone station set.

SUMMARY OF THE INVENTION

The problems and limitations discussed above are overcome by the present apparatus for controlling the application of telephone line power in a telephone set. A telephone set in accordance with the present invention includes a power supply capable of being charged when the telephone set is in either an on or off-hook switchhook condition. First and second regulators regulate the charging of first and second voltage storage means of the power supply. One storage means provides power for a prolonged period of time to a random access memory associated with a data processor as, for example, when the telephone set is unplugged from the telephone line and moved to another jack at the telephone customer's premises. The power supply derives an on-hook charging input through a resistance from the telephone central office side of a dial pulsing and switchhook circuit. An off-hook charging input is derived from the telephone station circuitry side of the dial pulsing and switchhook circuit.

A telephone set in accordance with the present invention further includes a voltage threshold detector circuit for controlling the application of power by monitoring the power supply voltage and actuating a power-down of power consumptive elements. When the voltage provided by the power supply falls below a threshold value, the voltage threshold detector circuit, for example, actuates a power-down of the data processor.

Another means for controlling the application of power supply voltage and, hence, the telephone line voltage is a telephone impedance switch. When the data processor recognizes that an element such as a loudspeaker amplifier requiring a high voltage for operation is to be activated, the telephone impedance switch intentionally increases the direct current resistance of the telephone set. This action increases the line voltage across the telephone set's terminals. The increased voltage then is transmitted through the off-hook charging input and through the power supply to that element, in this case the loudspeaker amplifier, which requires it.

The above advantages and further advantages of the present apparatus for controlling the application of telephone line power are disclosed in greater detail in the forthcoming detailed description of the invention.

DETAILED DESCRIPTION

Figures 1, 6:
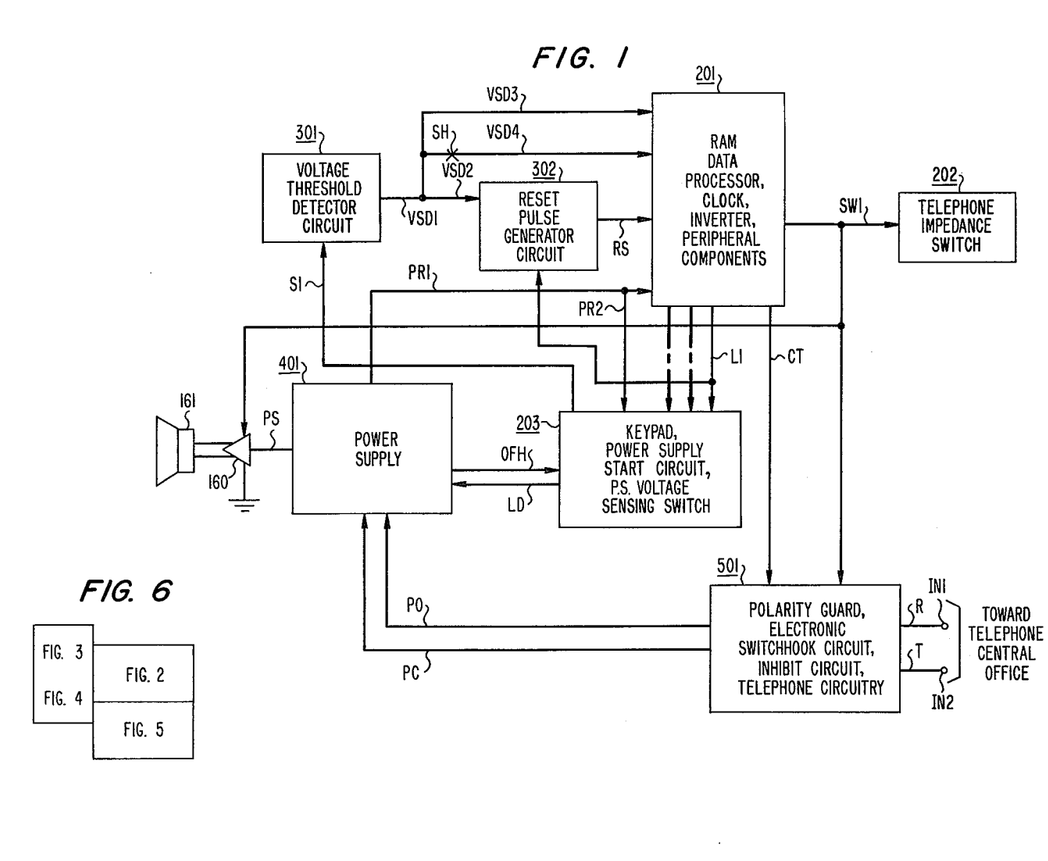
FIG. 1 is a block diagram of a telephone station set incorporating the present apparatus for controlling the application of telephone line power.
FIG. 6 is a key drawing showing the relationships among FIGS. 2, 3, 4, and 5, the end result being a detailed schematic drawing corresponding to the block diagram of FIG. 1.

Referring to FIG. 1, a block diagram is shown of the component elements of a telephone station set incorporating the present apparatus for controlling the application of telephone line power. The first digit of reference characters associated with the blocks of the block diagram indicates the number of the figure wherein is shown a detailed schematic diagram of the associated block. For example, the digit 4 in reference character 401 directs one to FIG. 4 wherein a detailed schematic diagram is presented of the referred-to power supply.

The telephone set of FIG. 1 is connected presumably in plug and jack fashion to a telephone line at terminals IN1 and IN2 having tip T and ring R leads to a telephone central office. Block 501 connecting to the telephone central office line has incorporated therein a polarity guard circuit for protecting the telephone set from changes in polarity of a telephone line voltage. It also comprises a dial pulsing and electronic switchhook circuit. The dial pulsing circuit is disclosed in particular detail in a copending patent application, Ser. No. 364,752, filed Apr. 2, 1982, by Donald D. Huizinga, Donald R. Means and Edward W. Underhill. Block 501 further comprises an inhibit circuit for controlling operation of the dial pulsing circuit and discloses the relationship of these to the rest of the telephone transmission and reception circuitry.

On-hook charging input lead PC connects the telephone line side of the dial pulsing circuit to power supply 401. Off-hook charging input lead PO runs from the telephone circuitry of block 501 to power supply 401. In this manner, power supply 401 is capable of being charged by the telephone line when the telephone set is in either an on or off-hook switchhook condition.

Power supply 401 provides power over power lead PS, to telephone circuitry including a loudspeaker amplifier 160 for operating loudspeaker 161 for hands-free operation. In addition, power supply 401 provides power over leads PR1 and PR2 to all of the components of boxes 201 and 203. A data processor included in box 201 consumes most of the power applied in the telephone set.

In order to conserve data processor power, a special arrangement is incorporated into block 203 in association with blocks 301 and 302. The data processor is powered when there is sufficient voltage to operate it, and the telephone set is either off-hook or turned on for hands-free operation.

The decision regarding whether sufficient voltage is present is accomplished at block 301, representing a voltage threshold detector circuit. The power supply output lead PR1 via lead PR2 is monitored at a power supply voltage sensing switch of block 203. The power supply voltage sensing switch provides a signal on lead S1 to voltage threshold detector circuit 301, the signal on lead S1 being just one saturated transistor drop lower than the output supply voltage on lead PR1. If the voltage on lead S1 is higher than a particular threshold value, a signal on voltage shut down lead VSD1 is provided to actuate reset pulse generator circuit 302 over lead VSD2 and to the data processor of block 201 over leads VSD3 and VSD4.

If there is not sufficient voltage, a second signal is transmitted over voltage shut down lead VSD1 via lead VSD2. In this case, reset pulse generator circuit 302 does not transmit a reset pulse on lead RS to the processor of block 201. Employing algorithms described in greater detail in the forthcoming data processor power-up and power-down section of the specification, the data processor is enabled to enter either a "halt" mode or an operating mode responsive to the inputs on leads RS, VSD3 and VSD4.

The decision as to whether the telephone set is turned on is made within blocks 201 and 203. In particular in block 203, one element, for example an "ON" button, of a keypad matrix is connected to a power supply start circuit. That start circuit in turn actuates the power supply voltage sensing switch. A signal on lead L1 from the data processor of block 201 holds up the power supply start circuit and the reset pulse generator circuit 302. Information as to the switchhook condition is passed to the data processor over lead VSD4. By passing lead VSD4 through a switchhook contact, the data processor of block 201 is capable of recognizing whether the telephone set is on or off-hook. Thereafter, the data processor of block 201 scans the keypad of block 203 to ascertain if the telephone set is turned on.

Another feature of the present apparatus is telephone impedance switch 202. The data processor of block 201 recognizes when the user of the telephone set desires to use certain features by scanning the keypad of block 203. In particular, if it is recognized that the user wishes, for example, to actuate the hands-free operation feature, the data processor associates the actuation of that feature with a requirement to provide a higher voltage than normal to loudspeaker amplifier 160. Accordingly, telephone impedance switch 202 is actuated responsive to the data processor's signal. It causes a resistance to be connected in series with the telephone circuitry so that the central office voltage is intentionally increased at telephone set terminals IN1 and IN2. The higher voltage is passed over lead PO through power supply 401 to amplifier 160.

The above discussion is intended as an overview of some of the features of the telephone station apparatus depicted in FIG. 1. In the subsequent discussion of FIGS. 2, 3, 4, and 5, a greater understanding of the above disclosed features and other features can be obtained. The subsequent discussion assumes, however, that FIGS. 2, 3, 4, and 5 are arranged in conformity with the key figure of FIG. 6.

POWER SUPPLY CIRCUIT

Figure 4:
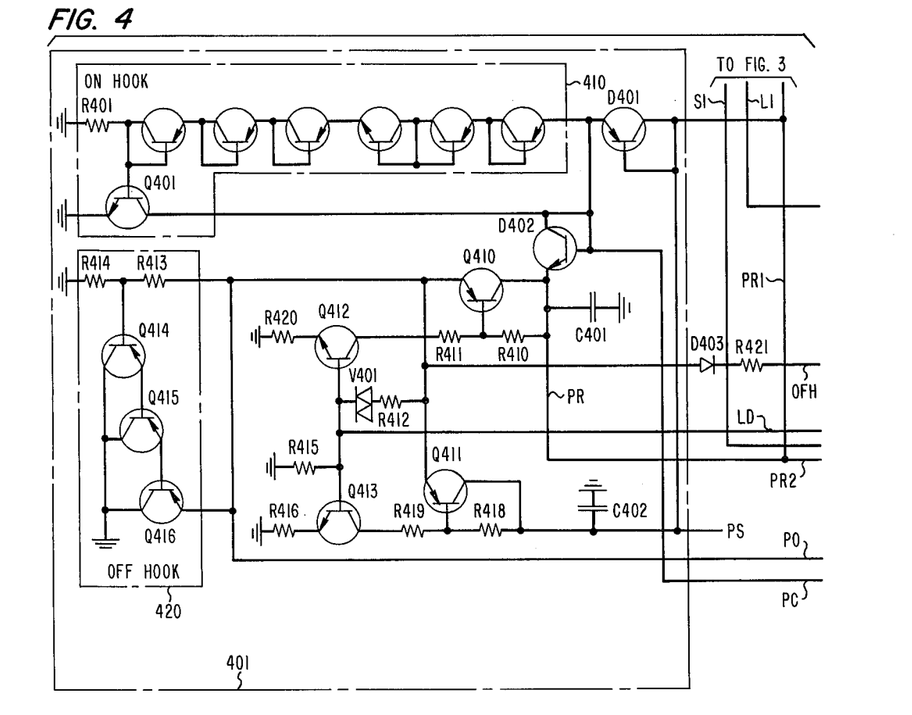
FIG. 4 is a schematic drawing showing the power supply of FIG. 1 and its component first and second voltage storage means, first and second charging inputs and first and second regulator circuits.

Referring to FIG. 4, the power supply circuit of the present invention comprises an on-hook regulator 410, an off-hook regulator 420, first and second charging inputs PO and PC, first and second outputs PS and PR, and first and second voltage storage means C401 and C402. In addition, charging diode circuits are provided on both charging input leads PO and PC to prevent unwanted discharge back through the telephone circuitry or the telephone line. On lead PC charging diode D401 provides on-hook charging of voltage storage means C402, and diode D402 provides on-hook charging of voltage storage means C401.

Similarly on lead PO, there are provided charging diode circuits for off-hook charging of voltage storage means C401 and C402. These diode circuits are specially designed for low voltage charging. In particular, one low voltage diode circuit comprises resistors R410, R411, and R420, and transistors Q410 and Q412, while the other circuit comprises resistors R416, R418, and R419, and transistors Q411 and Q413. Both circuits share resistors R412 and R415 and varistor V401. As off-hook charging lead PO provides a lower direct current charging voltage than lead PC, these charging diode circuits permit charging down to a particular off-hook voltage level and preclude charging below that level.

Figure 5:
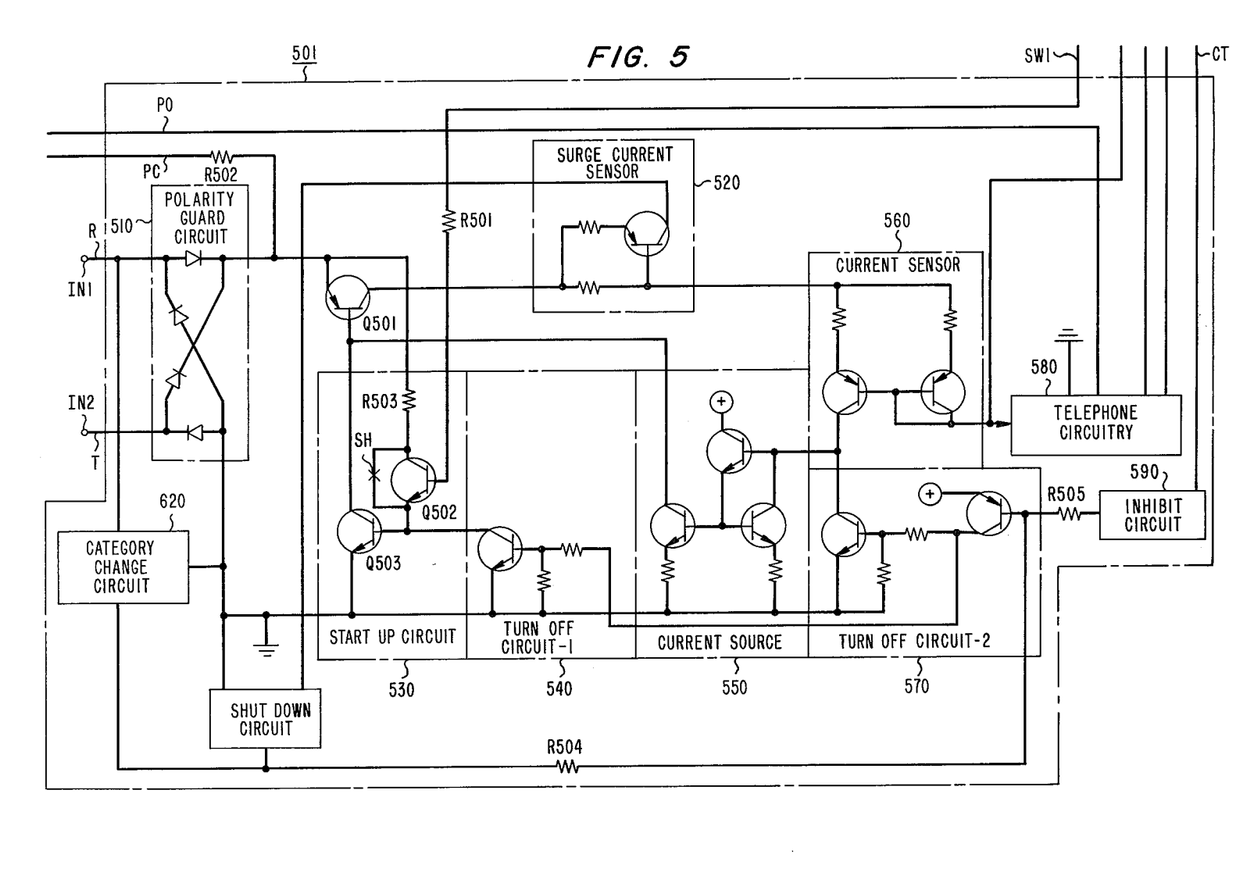
FIG. 5 is a schematic drawing showing the dial pulse and electronic switchhook circuit, the polarity guard circuit, the inhibit circuit, and their association with the rest of the transmission and reception telephone circuitry.

In order to understand the connection of the charging input leads PO and PC to power supply 401, it is necessary to refer to FIG. 5. Referring to FIG. 5, it may be understood that charging input lead PC connects through a resistor R502 to the telephone line side of a dial pulsing and switchhook transistor Q501. In this manner, the power supply is capable of being directly charged, regardless of whether or not the switchhook transistor Q501 is operated. Charging lead PO, on the other hand, is connected to the transmission and reception telephone circuitry 580 and requires the operation of both the switchhook transistor Q501 and the current sensing transistors of current sensor 560. By design, resistor R502 limits charging when switchhook transistor Q501 is operated and line voltage is expected to be high. With the switchhook transistor operated and line voltage low, the resistance inherent in the loop current path and telephone circuitry 580 is sufficient. Accordingly, no resistor is shown in charging lead PO.

Figure 2:
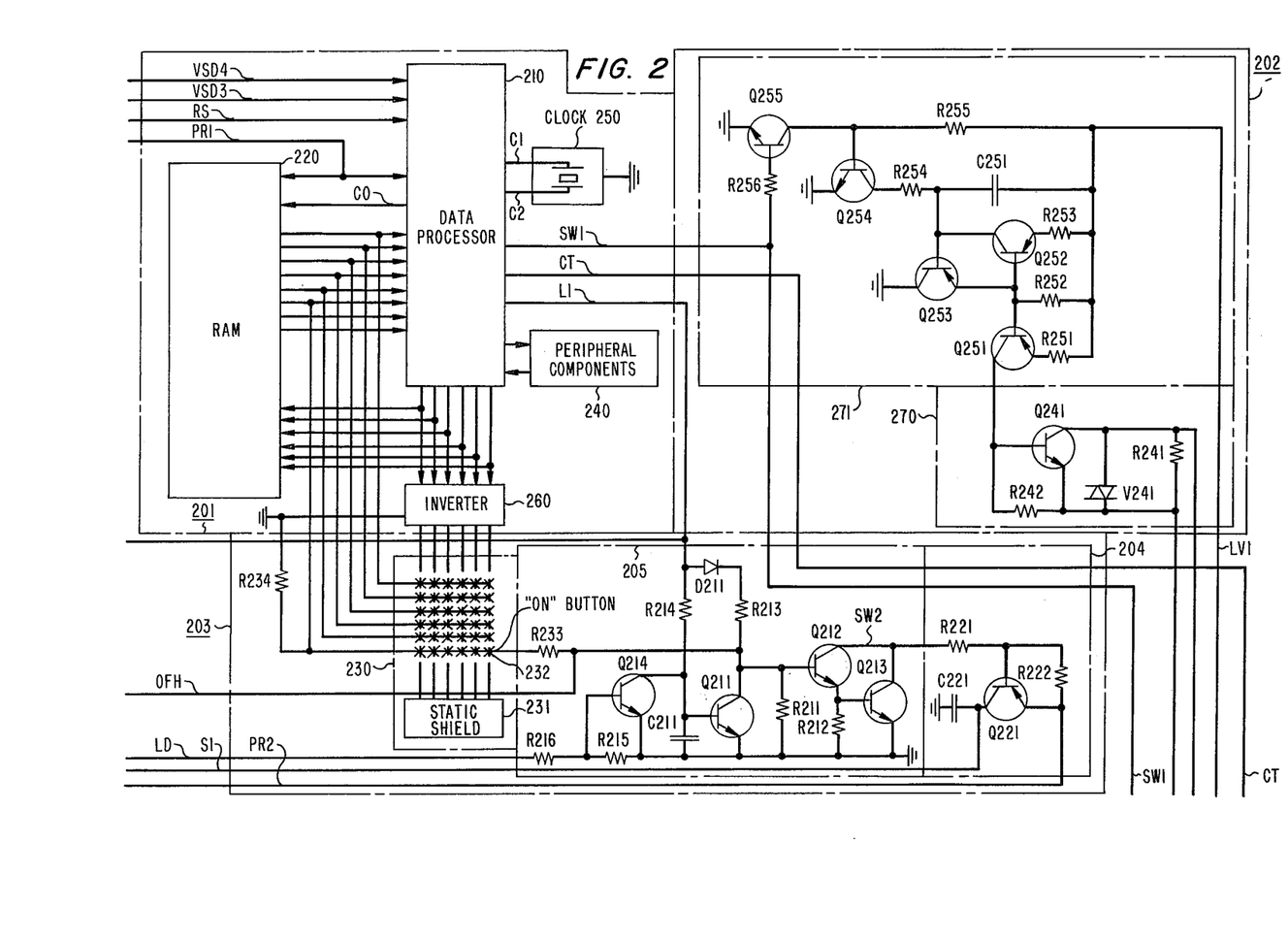
FIG. 2 is a schematic drawing showing the data processor, random access memory, clock, inverter circuit, peripheral components surrounding the processor, telephone impedance switch keypad, power supply start circuit, and power supply voltage sensing switch of the telephone set of FIG. 1.
Figure 3:
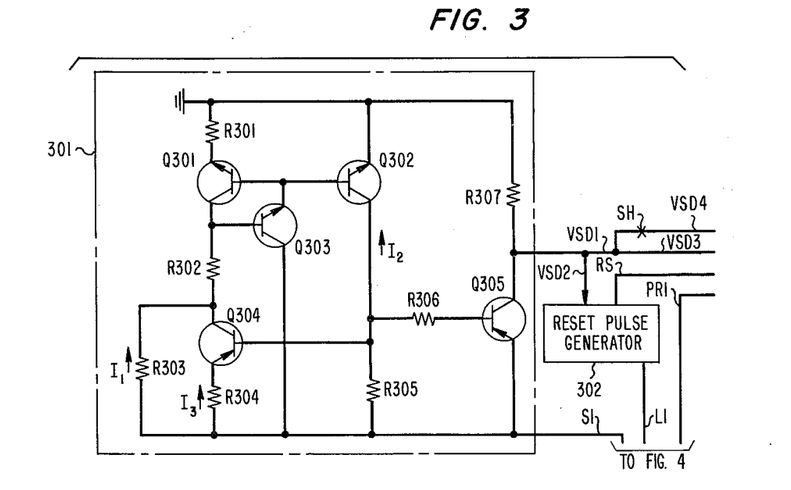
FIG. 3 is a schematic drawing showing the voltage threshold detector circuit and reset pulse generator circuit of the telephone set of FIG. 1.

In order to understand provision of power by power supply 401, it is necessary to refer to FIGS. 1, 2, and 3. Referring first to FIG. 1, it may be seen that power supply lead PS provides power to loudspeaker amplifier 160 for operating a loudspeaker 161. This is an illustrative example only in that other applications will become obvious to one skilled in the art upon reading the subsequent discussion of telephone impedance switch 202. A feature associated with switch 202 will be discussed which involves the requirement of loudspeaker amplifier 160 for a higher operating voltage than lead PS would normally provide. Accordingly, other applications of lead PS will become obvious when this requirement is discussed in greater detail.

Referring to FIGS. 2 and 3, it is seen that power supply lead PR1 provides power through FIG. 3 to data processor 210 and random access memory 220. Data processor 210, responsive to inputs on leads VSD3 and VSD4, decides whether it should turn down itself, its clock 250 and certain associated peripheral components 240. These peripheral components might include, for example, depending on the features provided, a liquid crystal display, other visual indicators, and a dual tone frequency dial. The essential random access memory 220 is continuously provided power while data processor 210 makes decisions about power application to non-essential power consumptive elements including itself.

VOLTAGE THRESHOLD DETECTOR CIRCUIT

Referring to FIG. 3, there is shown a schematic drawing of a voltage threshold detector circuit 301 which responds to a voltage level applied on lead S1 and indicates by the state of its output on lead VSD1 whether that voltage level is above or below a specified threshold. This circuit differs from the well-known Schmitt trigger circuit inasmuch as it senses its own DC bias voltage, whereas a Schmitt trigger circuit requires a DC bias separate from its input. Therefore, the present voltage threshold detector circuit 301 can be used to determine if a power supply voltage level varies above or below a specified level and to actuate the power-down of other circuits, such as data processor 210 (FIG. 2), which requires a minimum operating voltage level. Circuit component values of the present circuit 301 can be adjusted so that the circuit provides a stable, temperature independent actuating voltage.

As the voltage at supply lead S1 increases from zero, a current I1 begins to flow through resistor R303 into a current mirror consisting of transistors Q301, Q302 and Q303 and resistors R301 and R302. Because the current mirror has an emitter-degeneration resistor R301 in the input leg and none in the output leg, the collector current flow I2 of transistor Q302 increases rapidly causing the voltage across resistor R305 to increase rapidly in comparison to the rate of increase in the voltage level on lead S1. Consequently, as the voltage across resistor R305 increases, transistor Q304 begins to turn on causing a current I3 to flow into resistor R302. As a result, the total current I1 and I3 flowing into the current mirror increases. Therefore, there is a positive current feedback which increases as the voltage level on lead S1 increases until the feedback loop becomes unstable. At the point of instability, the circuit switches abruptly to its ON state and transistor Q304 is driven into saturation. Simultaneously, the currents I3 and I2 increase abruptly. The voltage across resistor R305 also increases abruptly turning on output transistor Q305.

Once transistor Q305 and, consequently, the circuit 301 has switched to its ON state, the current flowing into the current mirror is increased because transistor Q304 has turned on allowing current I3 to flow through resistor R304 along with the current I1, flowing through resistor R303 into the current mirror. Therefore, the voltage level on lead S1 must be lowered to an amount depending on the relative sizes of resistors R303 and R304 before the circuit will switch back to its OFF state. The amount of hysteresis exhibited by the circuit depends, therefore, on the relative sizes of resistors R303 and R304.

The turn-on and turn-off threshold voltages can be determined from an analysis of the relationships involving the currents flowing in the feedback loop. The relationship between the current in the output leg and the current in the input leg of the current mirror is $$I2 = N(I1+I3) \exp(q/kT)(I1+I3)R301 \qquad (1)$$

where N is the ratio of the emitter area of transistor Q302 to the emitter area of transistor Q301, q and k are constants and T is the absolute temperature. The relationship between currents I3 and I2, until transistor Q304 saturates, is $$I3 = \alpha T^3 \exp(q/kT)(I2R305 - I3R304 - Vgo) \qquad (2)$$

where $\alpha$ is a constant and Vgo is the bandgap voltage of silicon at zero absolute temperature.

From the above two equations, it is seen that current I3 is a function of current I2, and that I2 is a function of current I1 plus current I3. These relationships can be combined and described as follows:

$$I3 = F(I1+I3). \qquad (3)$$

The circuit is stable at values of I1 and I3 for which solutions to this equation exist.

With respect to this functional relationship between I3 and I1+I3, its value is zero when I1+I3 is equal to zero and increases with an ever increasing slope as I1+I3 increases. Consequently, a family of curves for F(I1+I3), for different values of I1, is defined. The intersections of these curves with the line I3=I3 correspond to stable operating points.

As I1 is increased from zero, a point is reached where, for some value of I1, the curve representing that value of I1 does not intersect the line I3=I3, and the circuit becomes unstable. At that point, I3 increases abruptly until it is limited by the value of resistor R304 when transistor Q304 saturates. Temperature insensitivity can be satisfied for a given threshold value on lead S1 by choosing a proper number of diode drops in the input leg of the current mirror and then adjusting the resistor ratio of R301 to R301+R302+R303.

DATA PROCESSOR POWER-UP AND POWER-DOWN

Referring now to FIG. 2, the operation of powering up and powering down the data processor 210 will be discussed in detail. At the same time, brief references will be made to FIG. 7, a simplified flowchart showing the power-up and power-down operation of data processor 210.

The data processor 210 shown in FIG. 2 is, in particular, a microcomputer having its own read only memory. In other applications, a microprocessor may be employed. Both may require a separate random access memory 220 which is powered up continuously.

Data processor 210 may be powered up by depressing an "ON" button 232 of a keyboard 230 while the telephone switchhook is in an on-hook condition. The "ON" button generally indicates a request for dial tone and for hands-free loudspeaker operation of the telephone set while the telephone set is on-hook. Dial tone is requested without hands-free operation by taking the telephone set off-hook. These operating characteristics may be varied in accordance with well-known principles but will be assumed in the present case.

In order to understand the power-up of data processor 210 upon actuation of "ON" button 232, it is first important to discuss the connection of "ON" button 232 to power supply start circuit 205. Keypad 230 comprises a matrix of normally open switchable elements including "ON" button 232. "ON" button 232 rests on a row of switchable elements which is maintained at a low state by a connection through resistor R234 to ground. The column including "ON" button 232 is held in a high state by inverter 260 and data processor 210. "ON" button 232 is also connected through resistor R233 to power supply start circuit 205.

The actuation of "ON" button 232 then causes a momentary high state to turn on transistors Q212 and Q213 of power supply start circuit 205. Their output on lead SW2 triggers power supply voltage sensing switch 204 comprising transistor Q221. Power supply output lead PR2 is connected to the emitter of transistor Q221 and, as a consequence of the saturation of Q221, a signal is provided over lead S1 which is one saturated transistor drop below the power supply voltage on lead PR2. Lead S1 is, in turn, connected to the voltage threshold detector circuit 301 whose operation has been described. Its output on lead VSD1 is a high state which is provided via lead VSD2 to a reset pulse generator 302 which operates on the transition to a high state on lead VSD2. It generates a reset pulse signal on lead RS to data processor 210. The output on lead VSD1 also passes through a switchhook contact to data processor 210 on lead VSD4, and directly to data processor 210 over lead VSD3.

Figure 7:
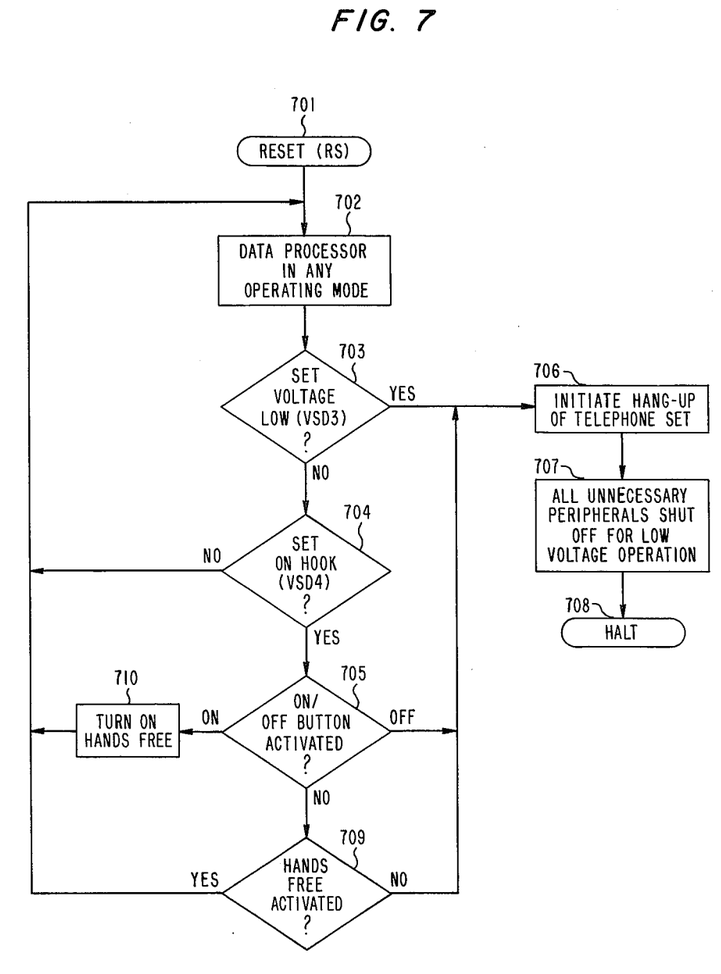
FIG. 7 is a simplified flowchart showing the power-up and power-down operation of the processor of FIG. 2.

Referring briefly to FIG. 7, the reset signal on lead RS signals data processor 210 to take itself out of a "halt" mode or turn down mode at RESET block 701 and to restart operation of its associated clock 250 and peripheral components 240.

After starting its clock 250, data processor 210 initializes itself and begins a scan of keyboard 230. Referring to FIG. 2, a signal is transmitted in a well-known process over columnar leads to keyboard 230 and if buttons have been actuated, a response is expected on the row element input lead associated with the actuated button.

Box 702 of FIG. 7 represents the entry of data processor 210 into a normal operating mode where it is either scanning inputs or actuating outputs.

At box 703, data processor 210 checks for adequate voltage by referring to the input on lead VSD3. At box 704, lead VSD4 is checked to ascertain the switchhook contact status. If the result is that the set is on-hook, data processor 210 recognizes at box 705 to turn on hands-free operation, since the result of a scan of "ON" button 232 of keyboard 230 is positive. When data processor 210 has recognized that "ON" button 232 has been actuated at box 705, the data processor also provides a high output on lead L1 which holds transistors Q212, Q213, and Q221 and the power supply to the data processor actuated. Consequently, the data processor 210 sets a bit in memory referring to hands-free operation at box 710. Data processor 210 also actuates apparatus associated with hands-free operations. That apparatus is more particularly described in the forthcoming description of telephone impedance switch 202.

A cyclical monitoring of leads VSD3 and VSD4 and ON/OFF buttons of keyboard 230 begins at decision block 702. If "ON" button 232 has been released, block 709 is entered, and the data processor checks whether the hands-free bit has been set in memory.

Normally, data processor 210 is powered up by going off-hook. Referring briefly to FIG. 5, going off-hook closes normally open contact SH, applying telephone line power to start up circuit 530. Start-up circuit 530 permits current flow through dial pulsing and switchhook transistor Q501. Current which is fed back through current sensor circuit 560 locks on switchhook transistor Q501. As a result, telephone line power is passed to telephone transmission and reception circuitry 580 and through that circuitry over off-hook charging lead PO to power supply 401.

Lead OFH connected to the off-hook charging lead PO is also connected through diode D403 and resistor R421 to power supply start circuit 205. In this manner, transistors Q212, Q213, and Q221 are actuated, as with an "ON" button actuation, and data processor 210 is signaled at RESET block 701 to begin its initialization process.

The user initiates a hang-up and a power-down of the data processor by going on-hook or, if the user is in a hands-free mode of operation, by depressing "OFF" button, not shown, of keypad 230. Thus, at block 704 of FIG. 7, control is passed to block 705. In hands-free mode of operation, block 706 is entered from block 705. Data processor 210 shuts off the hands-free feature, initiates hand-up, and finally initiates power-down of itself. In a non-hands-free mode of operation, the data processor at block 709 checks the status of the hands-free bit and passes control to block 706.

At block 706, a hang-up signal is transmitted by data processor 210 on lead CT. Lead CT is shown entering the turn off circuit 570 via inhibit circuit 590. In accordance with principles taught in D. D. Huizinga et al. U.S. patent Ser. No. 364,752 entitled Dial Pulsing Circuit filed Apr. 2, 1982, the switchhook transistor Q501 is switched open, and a hang-up is completed.

Thereafter, at block 707, unnecessary peripheral components 240 are powered down and data processor 210 enters a "halt" mode at block 708. There are two characteristics of the "halt" mode. The amount of current required for maintenance of data processor 210 is greatly diminished. Secondly, the data processor has essentially ceased operation. If operation were to continue below a minimum operating voltage, there are possible adverse results such as scrambled memory and the provision of undesirable random outputs.

Two other potential occurrences may also actuate a hang-up of the telephone set and a power-down of data processor 210. When a number of extension sets have gone off-hook at the terminals of a long telephone line having a high DC resistance, data processor 210 is powered down. Also, if the telephone set is unplugged from the telephone line, the data processor is powered down. These power-down processes are initiated by the low state of lead VSD3 caused by the previously discussed voltage threshold detector circuit 301 of an insufficient voltage level on lead S1 for proper data processor operation.

If the telephone set is unplugged while the set is off-hook, an open circuit appears across its tip T and ring R leads. Line power is lost, so immediately the voltage on charging input lead PO drops to 0 volts. Consequently, transistors Q412 and Q413 are brought down to a low state and a signal on lead LD deactuates the power supply start circuit 205. In particular, transistor Q214 is turned off, and capacitor C211 begins to charge through resistor R214. After a time constant interval, the voltage increase on capacitor C211 turns on transistor Q211, turning off transistors Q212 and Q213. The time delay permits such occurrences as momentary telephone line breaks and telephone central office signaling not to affect telephone operation. With the turning off of transistors Q212 and Q213, the power supply voltage sensing transistor Q221 is also switched to an off state causing the output on lead S1 to be brought low.

Consequently, voltage threshold detector circuit 301 recognizes a low voltage condition and switches its output on lead VSD1 to a low state. Referring briefly to FIG. 7, data processor refers to the status of lead VSD3 and the cyclical answer at block 703 becomes YES. The data processor 210, recognizing the low state on lead VSD3 initiates a hang-up pulse at box 706 and shuts unnecessary peripheral components down at block 707. It then enters the "halt" mode of operation at block 708.

Data processor 210 is similarly signaled to enter the "halt" mode when multiple extension telephone sets on the end of a long telephone central office line go off-hook. The voltage level appearing on lead S1 decreases as the telephone line voltage decreases when each extension telephone, connected in parallel with the subject telephone set, goes off-hook. Voltage threshold detector circuit 301 monitors the voltage level on lead S1. When it falls below a particular threshold level, circuit 301 provides a low signal on lead VSD1 which is reported to data processor 210 over lead VSD3 and recognized at block 703. The deactuation then depends primarily on the resistance length of the telephone subscriber's line and secondarily on the DC resistance value of extension telephone sets. Proper subscriber line design can alleviate this undesirable power-down. Similarly, limiting the number of extension telephone sets on the same subscriber telephone line can prevent data processor power-down.

TELEPHONE IMPEDANCE SWITCH

Referring to FIG. 2, a telephone impedance switch 202 is shown which comprises two elements: an impedance switch 270 and a loop voltage sensor and current amplifier 271. The problem solved by the telephone impedance switch 202 is that of deriving a higher voltage than normal from the telephone line for components requiring the higher voltage for proper operation. For example, loudspeaker amplifier 160 (FIG. 1) may require a higher voltage for operation than the low voltage available at the end of a long subscriber line. Consequently, some means for deriving a higher voltage from the line is required if the telephone set having a hands-free operation feature is to remain line-powered. The problem is further complicated in that, while switched series resistance is a solution for deriving the required higher voltage, the operation of the switch requires a source of direct current telephone line current which does not detract from the voice frequency alternating current energy passed to and from telephone transmission and reception circuitry 580.

The loop voltage sensor and current amplifier 271 comprise an actuation lead SW1 and a loop voltage monitor lead LV1 connected to a convenient monitor point in telephone transmission and receiver circuitry 580 of FIG. 5. For normal, not hands-free operation, data processor 210 provides a low signal to sensor and amplifier circuit 271 over lead SW1. Transistor Q255 is turned off, turning on transistor Q254. This action permits a current mirror circuit to turn on comprising transistors Q251, Q252 and Q253. The current mirror circuit comprising capacitor C251 has a high voice frequency impedance but permits direct current to flow through the current mirror. The flow of direct current from the output of transistor Q251 is proportional to the voltage on the telephone line but does not interfere with voice frequency transmission.

The impedance switch 270 comprises switching transistor C241 and switching resistor R242. It switches an impedance comprising varistor V241, connected in parallel with resistor R241, in series with transmission leads to the transmission and reception circuitry 580 of the telephone set. With transistor Q241 conducting, the impedance is shorted from the transmisson path by the collector emitter path through transistor Q241. When transistor Q241 is deactuated and opened, the impedance is inserted, increasing the voltage at the telephone terminals IN1 and IN2 for hands-free operation of the telephone set.

What is claimed is:
1. Apparatus for controlling the application of power in a telephone set characterized by
a keyboard circuit (230) comprising row and columnar switch elements scanned by a data processing means (210); one switch element (232), upon its actuation while the data processing means is shut down, providing a signal to a power supply circuit (205); the power supply circuit in turn actuating a voltage threshold detection circuit (301) for comparing the voltage level output of a power storage means (C401) with a minimum threshold voltage level and for causing a start signal to be provided to the data processing means in the event that the voltage level output of the power storage means exceeds the minimum threshold voltage level.

2. Apparatus for controlling the application of power in a telephone set as recited in claim 1 further characterized in that the data processing means upon receiving the start signal performs a scan of the keyboard (230) and, in the event the result of the scan is an indication that the particular actuated switch element (232) remains in an actuated state, the data processing means latches the power supply circuit (205).

3. Apparatus for controlling the application of power in a telephone set comprising:

power storage means; and a voltage threshold detection circuit for determining when the voltage level available from the power storage means is adequate for operating power consumptive components of the telephone set, the voltage threshold detection circuit enabling the power consumptive components when the available voltage level exceeds a first threshold level and disabling the power consumptive components when the available voltage level is below a second threshold level that is less than the first threshold level, the voltage threshold detection circuit being essentially temperature insensitive and including self-biasing means for providing reference current that is a function of the voltage level available from the power storage means.

4. Apparatus as in claim 3 wherein the voltage threshold detection circuit functions down to zero volts.

5. Apparatus as in claim 3 wherein the self-biasing means is associated with a current mirror circuit, the current mirror circuit feeding forward the reference current and, as the voltage level available from the power storage means increases, causing a derived current to flow, the derived current actuating an output transistor for enabling the power consumptive components of the telephone set.

6. Apparatus as in claim 5 wherein the current mirror circuit comprises at least bipolar transistors, an input leg transistor and an output leg transistor, the input leg transistor having an emitter degeneration resistor.

7. Apparatus as in claim 3 wherein the self-biasing means comprises a transistor having its collector to emitter path connected in series with a resistor, the combination being in parallel with a current bypass resistor and providing the reference current.

* * * * *